May 20, 1958

K. E. BUCKMAN 2,835,393

FILTER ELEMENTS

Filed Sept. 27, 1954

Inventor
Kenneth Ernest Buckman
By
Attorney

May 20, 1958   K. E. BUCKMAN   2,835,393
FILTER ELEMENTS
Filed Sept. 27, 1954   3 Sheets-Sheet 2
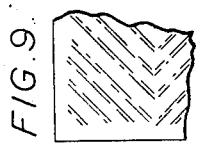
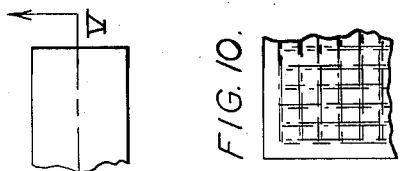
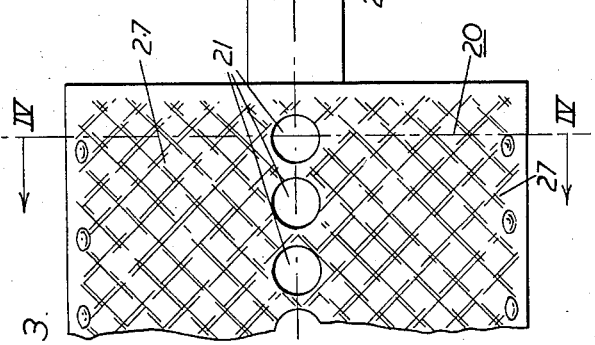
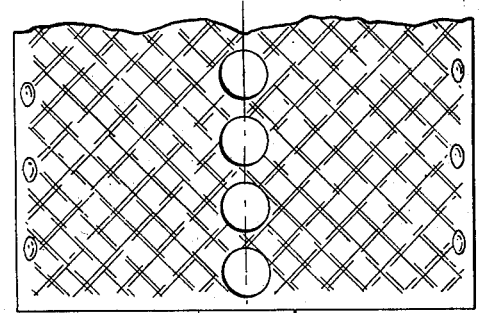
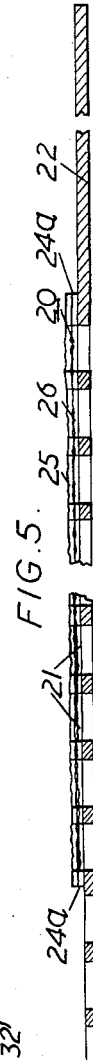
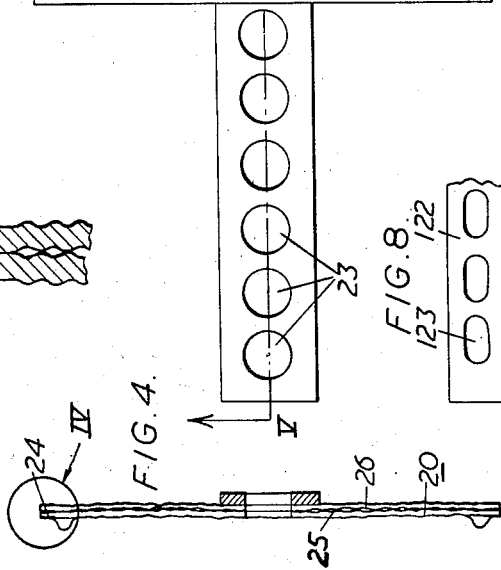
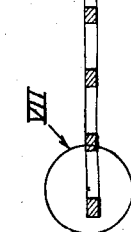
Inventor
Kenneth Ernest Buckman
By
F. E. Jones
Attorney

United States Patent Office 2,835,393
Patented May 20, 1958

2,835,393

FILTER ELEMENTS

Kenneth Ernest Buckman, Redbridge, England, assignor to General Motors Corporation, Detroit, Mich., a corporation of Delaware Application September 27, 1954, Serial No. 458,327

Claims priority, application Great Britain October 12, 1953

5 Claims. (Cl. 210—487)

This invention relates to fluid filters and particularly to filter elements for such filters.

In the filter element of this invention use is made of a central radially-apertured tube about which a double layer of a filter medium, such as paper, is spirally wound. The adjacent edges of the two layers of filter medium are sealed. One or more combined spacer and sealing strips is firmly wound with and between the convolutions of the filter medium; and the filter medium has a series of spaced apertures interconnected, and connected to the apertures in the tube, by apertures in or between the sealing strip or a passage between the sealing strips.

The series of spaced apertures are substantially along the centre line of the filter medium; and can be spaced uniformly or at random.

The combined spacer and sealing strip can be a single perforated strip with perforations spaced uniformly or at random and forming the above-mentioned passages: or it can be two parallel strips the space between which forms the passages.

So as to form passages for the filtered fluid, the layers of the double layer of filter medium can be separated by lands and grooves formed in the paper, or by a separator such as a corrugated strip or wire or string mesh.

Projections can also be provided on the external surfaces of the double layer of filter medium of equivalent protrusion to the thickness of the spacer and sealing strip, to space the spiral turns of the double layer at points remote from the spacer and sealing strip. These projections can protrude sufficiently at the edges of the double layer to ensure contact of the edges of the layers and thus to form a seal between these edges in the rolled form, alternatively the edges can be sealed by adhesive or clamping e. g. by crimping.

The scope of the invention is defined by the appended claims; and how it can be carried into effect is hereinafter particularly described with reference to the accompanying drawings in which:

Figure 3 is an elevation of a portion of a double filter paper and a combined sealing and spacer strip which form part of the element;

Figure 4 is a section on line IV—IV of Fig. 3;

Figure 5 is a section on line V—V of Fig. 3;

Figure 6 is an enlargement of the detail marked IV in Fig. 4;

Figure 7 is an alternative form of the detail marked VII in Fig. 5;

Figure 8 is an alternative form of a detail;

Figures 9 and 10 illustrate different methods of corrugating the filter paper;

Figure 1:
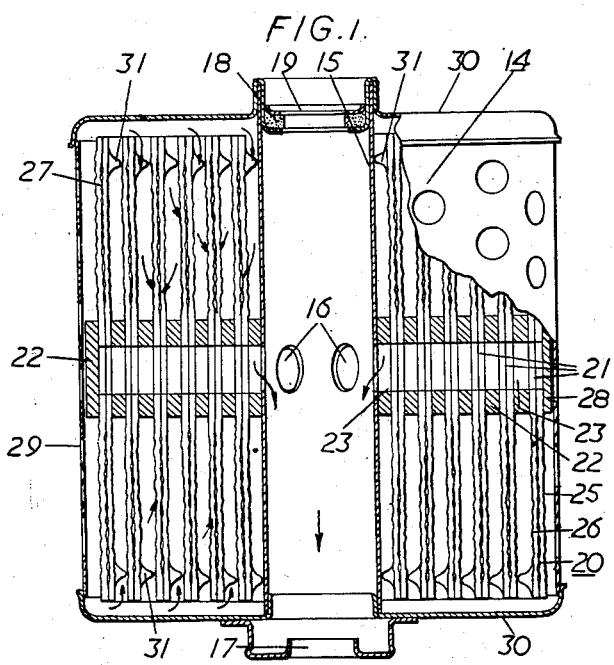
Figure 1 is an elevation, largely in section, of an oil filter element embodying the invention.
Figure 2:
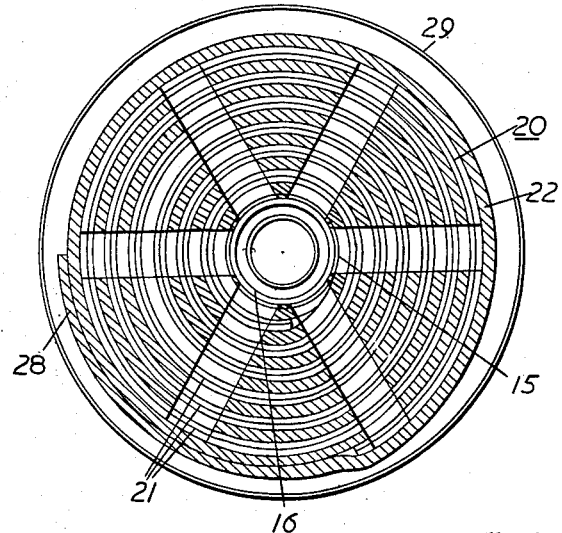
Figure 2 is a diagrammatic section.
Figure 11:
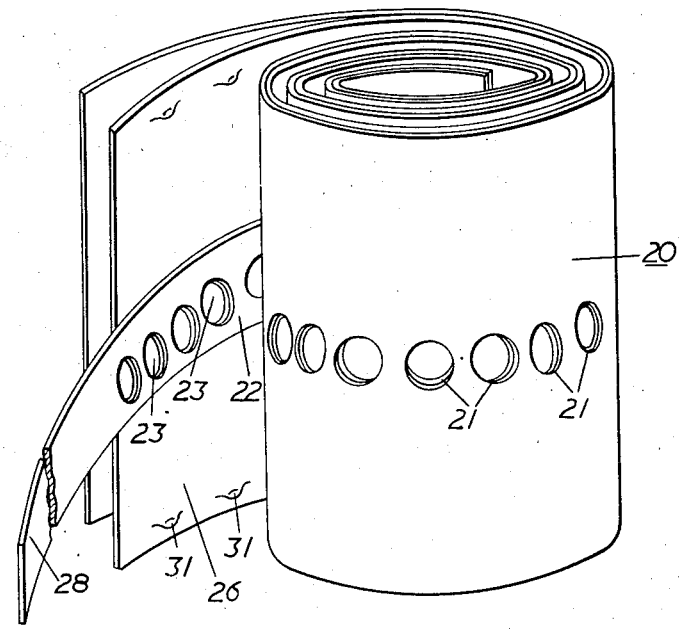
Figure 11 is a perspective view illustrating a step in the process of forming a filter element.

The filter element 14 shown in Figs. 1 and 2 comprises a central tube 15 which has a plurality of spaced radial apertures 16 the centres of which lie on a circle in a transverse plane which bisects the tube 15 longitudinally.

The tube 15 is open at one end 17 and is sealed at the other end by a sealing member 18 and a cap 19. A double layer of paper 20 (Figs. 1, 2, 3 and 11) having a central line of apertures 21 is wrapped spirally round the tube 15 with a combined spacer and sealing strip 22, having spaced apertures 23 (Figs. 1, 4 and 5) which preferably register with apertures 16 and 21 or overlap these apertures, firmly wound between adjacent convolutions of the paper and on the central line thereof. The long edges 24 (Fig. 4) of the two layers of paper 25 and 26 and the short edges 24a (Fig. 5) are sealed together preferably during rolling, and the paper has intersecting lands and grooves 27 (Fig. 3) for fluid flow between the layers 25 and 26.

At the outer edge of the spiral the sealing strip 22 is continued around the element at 28 but there are no perforations in this part of the strip. The outer periphery of the element 14 is encased in a perforated cylindrical cover 29 and the ends enclosed by plates 30 which fit over the ends of the tube 15 and of the cover but are spaced from the element.

Adjacent convolutions of paper are separated by projections 31 (Figs. 1 and 11) which are pressed out adjacent the edges of one layer of paper 26.

As indicated by the arrows fluid flows into the element 14 through the apertures in the cover 29 axially of the element to the ends thereof, and axially and from both ends of the element through the spaces between the convolutions towards the strip 22.

The fluid passes through the layers of paper 25, 26 into the intersecting lands and grooves 27 between the layers 25 and 26 and thence to the radial apertures 21.

Flow takes place through the apertures 23 in the strip 22 and the apertures 23 in successive convolutions through apertures 16 into the central tube 15, finally passing axially and internally of the tube 15 towards the open end 17 thereof.

The invention is particularly suitable for use in oil filter elements for oil filters in motor vehicles.

In Fig. 8 is shown an alternative shape for apertures 123 in the strip 122. The apertures 123 can be evenly spaced, as shown, or can be spaced at random.

In Figs. 9 and 10 alternative patterns of lands and grooves are shown.

The spacer strip 22 can be tapered at its ends as at 32 in Fig. 7, and can be stuck by adhesive to the filter paper.

Figure 12:
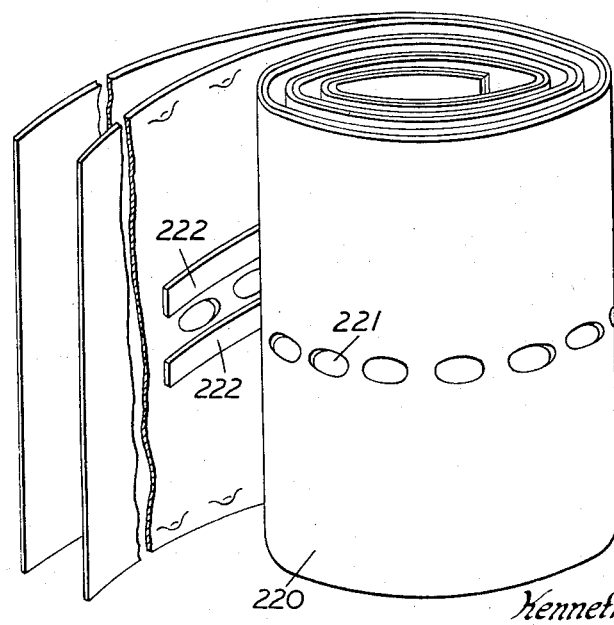
Figure 12 is a perspective view illustrating a step in the process of forming another form of filter element embodying the invention.

An alternative form of spacer strip 222 is shown in Fig. 12 in which the strip is in two parts on either side of central row of elongated apertures 221 in the filter paper 220. The strip 222 ends some distance from the end of the paper 220 which is wrapped round to complete the seal and is stuck by adhesive. Obviously, each radially extending row of apertures 221 does not extend through the outer ends of the layers of filter paper 220 as unfiltered fluid should not flow into the apertures.

Instead of forming the passageway between the two layers of paper by lands and grooves an inter-layer of string mesh, corrugated metal or the like can be used.

I claim:

1. A filter element comprising a tube with an aperture in its wall, a sheet having contacting layers of filter medium sealed together at their edges, said sheet forming multiple convolutions about said tube, said convolutions defining open flow passages between them at each end of the element, spacing means interposed between said convolutions, and said convolutions and spacing means having openings cooperating to form a passage communicating with said aperture and closed from the exterior of said element.

2. A filter element comprising a central tube with an aperture in its wall, a sheet of contacting layers of filter medium sealed together at their edges, said sheet forming multiple convolutions about said tube, projections formed on some of said convolutions contacting adjacent convolutions to define flow passages, spacing means interposed between said convolutions, and said convolutions and spacing means having openings communicating with said aperture and forming a passage closed to the exterior of said element.

3. A substantially cylindrical filter element comprising a tube with an aperture in its wall, a sheet having contacting layers of filter medium sealed together at their edges, each of said layers having lands and grooves formed on their adjacent surfaces to form fluid flow channels, said sheet forming multiple convolutions about said tube, spacing means interposed between said convolutions, said convolutions and spacing means having openings extending radially in said element and communicating with said aperture, and said element having a portion closing off said openings from the exterior thereof.

4. A filter including a casing with a perforated cylindrical wall and having an outlet at one end thereof, a filter element comprising a tube with an aperture in its wall, one end of said tube communicating with said outlet and the other end being closed, a sheet having contacting layers of filter medium sealed together at their edges, said sheet forming multiple convolutions about said tube within said cylindrical wall, spacing means interposed between said convolutions, and said convolutions and spacing means cooperating to form a passage closed at one end and extending from that end to communicate at its other end with said aperture.

5. A filter element comprising a tube with apertures in its wall intermediate its length, a sheet having double layers of filter medium sealed together at their edges, said sheet forming multiple convolutions about said tube, spacing means interposed between said convolutions and having openings communicating with said apertures, said convolutions having openings in communication with the said openings of said spacing means, and the openings of the convolutions and spacing means forming radially extending passages terminating short of the exterior of the filter element.

References Cited in the file of this patent

UNITED STATES PATENTS

| | | |
|---|---|---|
| 2,271,662 | Rubissow | Feb. 3, 1942 |
| 2,339,703 | Kamrath | Jan. 18, 1944 |
| 2,427,862 | Judkins | Sept. 23, 1947 |
| 2,464,870 | Kamrath | Mar. 22, 1949 |
| 2,507,818 | Sager | May 16, 1950 |
| 2,525,330 | Zaun | Oct. 10, 1950 |

FOREIGN PATENTS

| | | |
|---|---|---|
| 72,754 | Germany | Aug. 31, 1892 |
| 352,038 | Great Britain | July 6, 1931 |
| 535,153 | Great Britain | Mar. 1, 1941 |